(12) United States Patent
Chung

(10) Patent No.: US 10,502,817 B2
(45) Date of Patent: Dec. 10, 2019

(54) LASER TRANSMITTER AND METHOD FOR OPERATING THE SAME

(71) Applicant: Youn Min Chung, Gunpo-si (KR)

(72) Inventor: Youn Min Chung, Gunpo-si (KR)

( * ) Notice: Subject to any disclaimer, the term of this patent is extended or adjusted under 35 U.S.C. 154(b) by 0 days.

(21) Appl. No.: 16/189,172

(22) Filed: Nov. 13, 2018

(65) Prior Publication Data

US 2019/0271770 A1    Sep. 5, 2019

(30) Foreign Application Priority Data

Mar. 2, 2018 (KR) .......................... 10-2018-0025389

(51) Int. Cl.
*G01S 7/491* (2006.01)
*H04K 3/00* (2006.01)

(52) U.S. Cl.
CPC .............. *G01S 7/4911* (2013.01); *H04K 3/22* (2013.01)

(58) Field of Classification Search
CPC .......... G01S 7/38; G01S 7/483; G01S 7/4911; H04K 3/22
USPC ........................ 455/1, 67.11, 67.13, 500, 501
See application file for complete search history.

(56) References Cited

U.S. PATENT DOCUMENTS

| | | | | |
|---|---|---|---|---|
| 5,793,476 A | * | 8/1998 | Laakmann | G01P 3/36 356/28 |
| 6,903,674 B2 | * | 6/2005 | Hoesel | G01S 7/495 244/3.16 |
| 2010/0201560 A1 | * | 8/2010 | Chen | G01S 7/022 342/20 |
| 2014/0240161 A1 | * | 8/2014 | Davidson | G01S 17/88 342/14 |

\* cited by examiner

*Primary Examiner* — John J Lee
(74) *Attorney, Agent, or Firm* — Hauptman Ham, LLP

(57) ABSTRACT

Disclosed are a laser transmitter and a method for operating the same. The laser transmitter may include: a laser signal receiving unit configured to receive monitor laser signals transmitted by a laser-based speed monitor; a laser signal transmitting unit configured to transmit jamming laser signals against the received monitor laser signals; and a control unit configured to measure the signal intervals of the received monitor laser signals when the monitor laser signals are detected, compute information for the jamming laser signals by using the measured signal intervals, and generate the jamming laser signals according to the computed information.

7 Claims, 5 Drawing Sheets

LASER TRANSMITTER AND METHOD FOR OPERATING THE SAME

CROSS-REFERENCE TO RELATED APPLICATIONS

This application claims the benefit of Korean Patent Application No. 10-2018-0025389, filed with the Korean Intellectual Property Office on Mar. 2, 2018, the disclosure of which is incorporated herein by reference in its entirety.

BACKGROUND

1. Technical Field

The present invention relates to a laser transmitter and a method for operating the same.

2. Description of the Related Art

Developed countries currently utilize various types of speedometers or safety alarm transmitters that use different microwaves or lasers to recognize various hazardous road conditions. For example, different types of speed guns that measure the speeds of vehicles to prevent speeding may include types that use the X-band, Ku-band, K-band, Ka-band, lasers, etc. Also, safety watch systems that provide information on road conditions to allow save driving may transmit information regarding railway crossings, construction zones, emergency vehicles, etc., and safety warning systems may transmit 64 types of information regarding foggy areas, construction zones, school zones, reduced speed zones, etc., in encoded form.

For example, a radar detector is a system that detects a laser or a ultra-high frequency wave emitted from a speed gun to measure speed and inform the driver through voice, text, or signal tone means, etc. Several types of radar detectors using microwaves or lasers have been developed in certain advanced countries and are being used for the safe driving of vehicles.

The speed gun detection method used in navigation systems, GPS, etc., according to the related art may provide information to the driver only at positions inputted beforehand and cannot be used to detect mobile surveillance cameras of the microwave or laser type or used in a foreign country.

SUMMARY OF THE INVENTION

An aspect of the invention is to provide a laser transmitter and a method for operating the laser transmitter, which detects monitor laser signals transmitted towards a moving object by a speed monitor for measuring the speed of the moving object and transmits jamming laser signals against the detected monitor laser signals.

An aspect of the invention provides a laser transmitter.

A laser transmitter according to an embodiment of the invention may include: a laser signal receiving unit configured to receive monitor laser signals transmitted by a laser-based speed monitor; a laser signal transmitting unit configured to transmit jamming laser signals against the received monitor laser signals; and a control unit configured to measure the signal intervals of the received monitor laser signals when the monitor laser signals are detected, compute information for the jamming laser signals by using the measured signal intervals, and generate the jamming laser signals according to the computed information.

The control unit may measure the signal intervals sequentially by receiving a preset n number of monitor laser signals (where n is a natural number) and may compute a timing setting time, a signal interval, and a transmitting time of the jamming laser signals by using the measured signal intervals.

The timing setting time may be determined as the shortest signal interval from among the measured signal intervals.

The signal interval of the jamming laser signals may be determined as a common divisor of the measured signal intervals.

The transmitting time of the jamming laser signals may be computed by multiplying the average of the measured signal intervals by a preset number of monitor laser signals.

The control unit, after measuring the signal intervals sequentially by receiving the n number of monitor laser signals, may transmit the jamming laser signals for a duration of the computed transmitting time in the computed interval when the period of the timing setting time has passed from the time point when an n-th monitor laser signal is received.

If a monitor laser signal is received after the transmission of the jamming laser signals is completed, the control unit may repeatedly transmit the jamming laser signals by setting a timing with the timing setting time from the time point when the received monitor laser signal is received.

Another aspect of the invention provides a method for operating a laser transmitter.

A method for operating a laser transmitter according to an embodiment of the invention may include: receiving monitor laser signals transmitted by a laser-based speed monitor; measuring a signal interval of the received monitor laser signals; computing information for the jamming laser signals that are to be transmitted by using the measured signal intervals; and generating the jamming laser signals according to the computed information and transmitting the jamming laser signals.

A laser transmitter and a method for operating the laser transmitter can detect monitor laser signals transmitted towards a moving object by a speed monitor for measuring the speed of the moving object and can transmit jamming laser signals against the detected monitor laser signals.

Additional aspects and advantages of the present invention will be set forth in part in the description which follows, and in part will be obvious from the description, or may be learned by practice of the invention.

DETAILED DESCRIPTION OF THE INVENTION

In the present specification, an expression used in the singular encompasses the expression of the plural, unless it has a clearly different meaning in the context. In the present specification, it is to be understood that descriptions such as being "composed of" or "including", etc., are not to be interpreted as meaning that the various components or the various steps disclosed in the specification must all necessarily be included, but rather should be interpreted as meaning that some of the components or some of the steps may not be included or additional components or steps may further be included. A term such as "unit", "module", etc., in the specification refers to a unit component by which at least one function or action is processed, where such unit component can be implemented as hardware or software or as a combination of hardware and software.

Various embodiments of the invention are described below in more detail with reference to the accompanying drawings.

Figure 1:
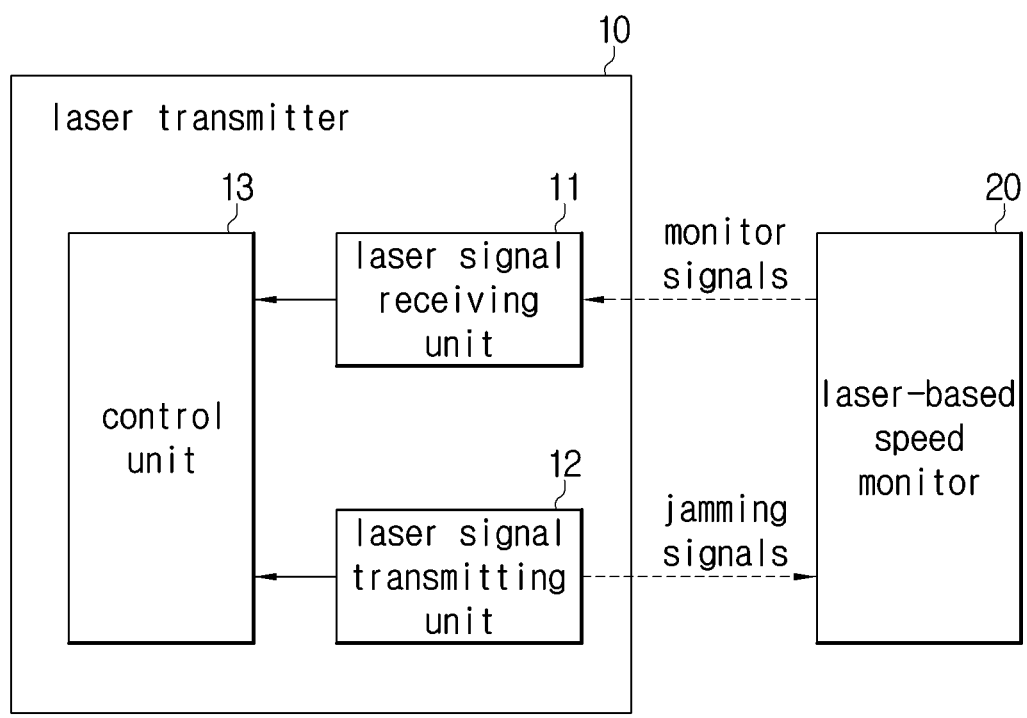
FIG. 1 is a diagram conceptually illustrating the composition of a laser transmitter according to an embodiment of the invention.
Figure 2:
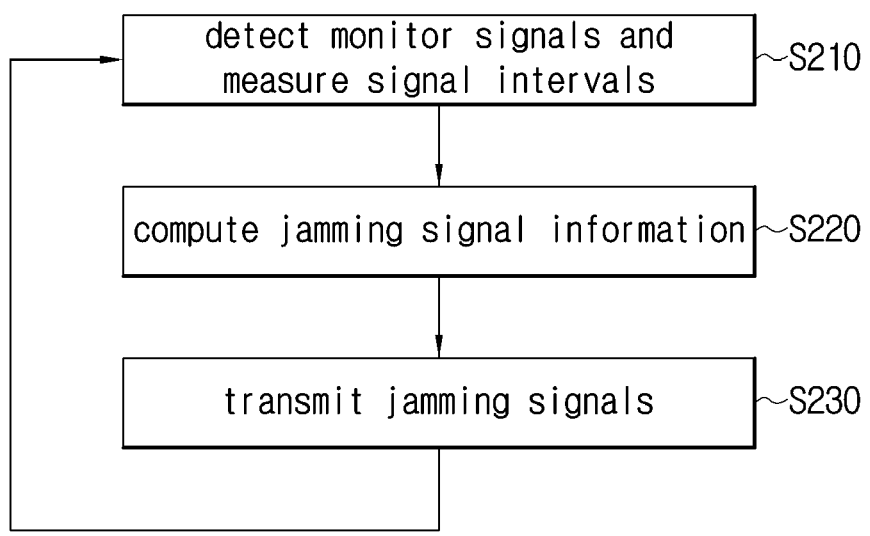
FIG. 2 is a flow diagram illustrating a method for operating a laser transmitter according to an embodiment of the invention.
Figure 3:
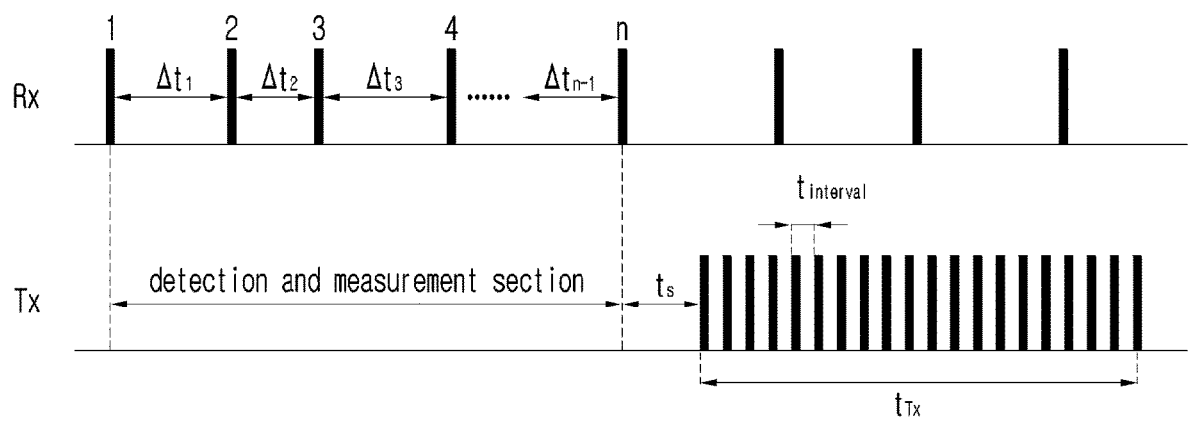
FIG. 3, FIG. 4, and FIG. 5 are diagrams for illustrating a method for operating a laser transmitter according to an embodiment of the invention.
Figure 4:
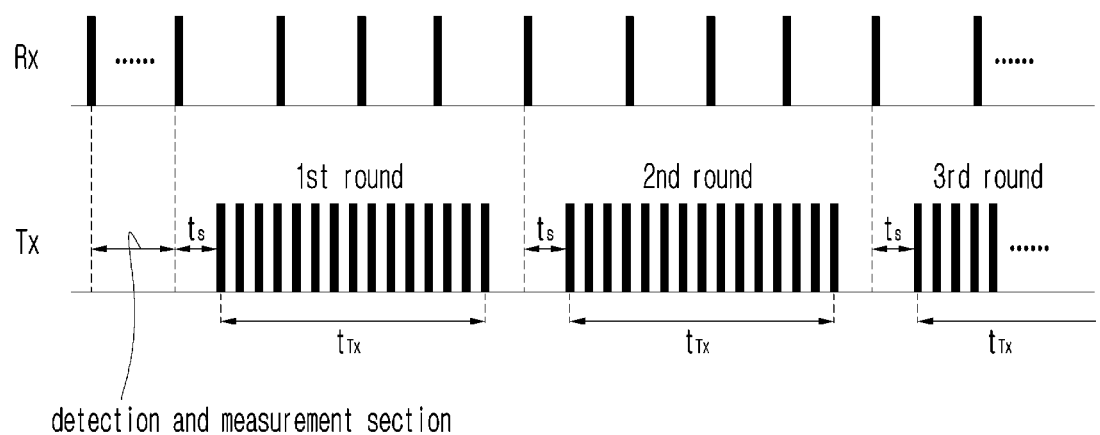
Figure 5:
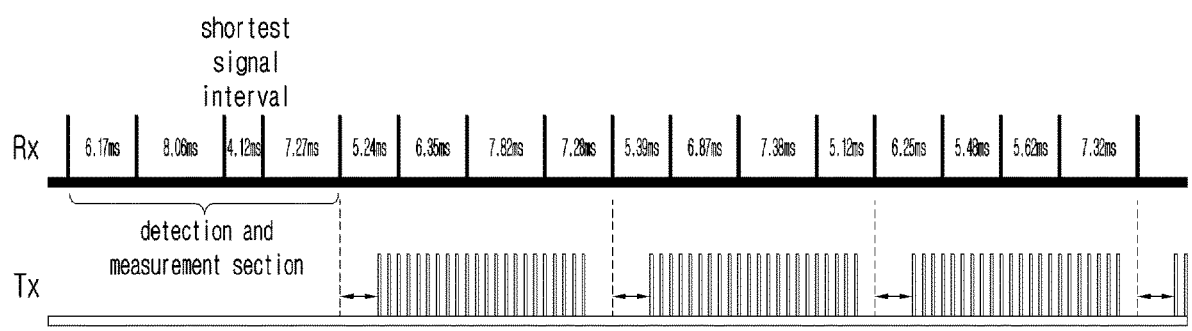

FIG. 1 is a diagram conceptually illustrating the composition of a laser transmitter according to an embodiment of the invention, FIG. 2 is a flow diagram illustrating a method for operating a laser transmitter according to an embodiment of the invention, and FIG. 3 through FIG. 5 are diagrams for illustrating a method for operating a laser transmitter according to an embodiment of the invention.

Referring to FIG. 1, a laser transmitter 10 according to an embodiment of the invention may include a laser signal receiving unit 11, a laser signal transmitting unit 12, and a control unit 13.

The laser signal receiving unit 11 may receive monitor laser signals transmitted by a laser-based speed monitor 20.

The laser-based speed monitor 20 can be, for example, a speed gun which uses a laser to measure the speed of a moving object.

The laser signal transmitting unit 12 may transmit jamming laser signals against the received monitor laser signals, according to the control of the control unit 13.

The control unit 13 may control the overall operation of the laser transmitter 10. For example, the control unit 13 can be composed of a memory that stores a program for performing a method of operating a laser transmitter according to an embodiment of the invention and a microprocessor that operates according to the program stored in the memory.

In particular, if it is detected that monitor laser signals have been received through the laser signal receiving unit 11, the control unit 13 may analyze the pattern of the received monitor laser signals, generate jamming laser signals against the monitor laser signals according to the analyzed pattern, and transmit the jamming laser signals via the laser signal transmitting unit 12.

Below, a description is provided of a method for operating a laser transmitter as performed by the control unit 13, with reference to FIG. 2.

In operation S210, the control unit 13 may detect monitor laser signals transmitted by the laser-based speed monitor 20 and measure the signal intervals between the received monitor laser signals.

Referring to FIG. 3, the control unit 13 may measure the signal intervals sequentially by receiving a preset n number of monitor laser signals (where n is a natural number).

The control unit 13, upon detecting the receiving of a first laser monitoring signal, can measure the signal interval $\Delta t_1$ between the first laser monitoring signal and second laser monitoring signal, the signal interval $\Delta t_2$ between the second laser monitoring signal and third laser monitoring signal, the signal interval $\Delta t_2$ between the third laser monitoring signal and fourth laser monitoring signal, . . . , and the signal interval $\Delta t_{n-1}$ between the (n−1)-th laser monitoring signal and n-th laser monitoring signal.

In operation S220, the control unit 13 may compute information for the jamming laser signals that are to be transmitted, by using the measured signal intervals of the monitor laser signals.

In order to jam the received monitor laser signals, the jamming laser signal signals may have to be transmitted immediately before the monitor laser signals are received. Therefore, a control unit 13 according to an embodiment of the invention, in order to transmit the jamming laser signals immediately before the monitor laser signals are received, may transmit jamming laser signals in as short an interval as possible before the receiving time of the monitor laser signal first received after the measuring of the signal intervals. In one example, the signal interval for the jamming laser signals can be modified according to the hardware performance of the laser diode included in the laser signal transmitting unit 12 and can be set as the shortest signal interval possible that can be implemented by the hardware.

Referring to FIG. 3, the control unit 13 may use the measured signal intervals of the monitor laser signals to compute a timing setting time $t_s$, an interval $t_{interval}$ between the jamming laser signals, and a transmitting time $t_{Tx}$ of the jamming laser signals.

In one example, the timing setting time $t_s$ can be determined as the shortest signal interval among the signal intervals of the measured monitor laser signals. Also, the interval $t_{interval}$ between the jamming laser signals can be determined as the greatest common divisor of the signal intervals of the measured monitor laser signals. Also, the transmitting time $t_{Tx}$ of the jamming laser signals can be computed by multiplying the average of the measured signal intervals of the monitor laser signals by a preset number of monitor laser signals that are to be jammed.

Generally, jamming may be achieved by transmitting jamming laser signals against at least three monitor laser signals.

As such, the number of monitor laser signals set for computing the transmitting time $t_{Tx}$ of the jamming laser signals can be set to at least 3. However, the number of monitor laser signals to be jammed can be increased to any level supported by the hardware performance of the laser diode included in the laser signal transmitting unit 12.

In operation S230, the control unit 13 may generate the jamming laser signals according to the computed jamming laser signal information and transmit the jamming laser signals via the laser signal transmitting unit 12 to the laser-based speed monitor 20.

Referring to FIG. 3, the control unit 13 can measure the signal intervals in order by receiving an n number of monitor laser signal signals, and afterwards, can transmit the jamming laser signals for a duration of the computed transmitting time $t_{Tx}$ in the determined interval $t_{interval}$ starting at a time point of the timing setting time $t_s$ after the point at which the n-th monitor laser signal was received.

For example, as illustrated in FIG. 4, if the number of monitor laser signals to be jammed is set to three in consideration of the performance of the hardware, then the transmitting time $t_{Tx}$ for the jamming laser signals can be set to three times the average of the measured signal intervals of the monitor laser signals. Also, referring to FIG. 4, the control unit 13 can perform a first round of transmissions when the timing setting time $t_s$ has passed since the time point at which the n-th monitor laser signal was received, transmitting the jamming laser signals for a duration of the computed transmitting time $t_{Tx}$ in the determined interval $t_{interval}$, and can perform a second round of transmissions with the timing set as the timing setting time $t_s$ at the time point of receiving a monitor laser signal that is received after the first round of transmissions is complete. Furthermore, if a monitor laser signal is received after the second round of transmissions is complete, the control unit 13 can perform a third round of transmissions and can continue repeating the transmissions of jamming laser signals according to whether or not monitor laser signals are received after a previous round of transmissions is complete.

The control unit 13 can determine whether or not to repeat the transmission of the jamming laser signals according to whether or not there are monitor laser signals received after a round of transmitting jamming laser signals is completed. Thus, if a monitor laser signal is received after a round transmitting jamming laser signals is complete, then the control unit 13 can repeatedly transmit the jamming laser signals by setting the timing to the timing setting time $t_s$ from the time point at which the received monitor laser signal is received, and if there is no monitor laser signal received, then the control unit 13 can stop the repeated transmission of jamming laser signals.

FIG. 5 illustrates an example of measurements taken for the signal intervals between received monitor laser signals. As illustrated in FIG. 5, a laser-based speed monitor 20 can transmit the monitor laser signals in random intervals.

Referring to FIG. 5, the shortest signal interval among the measured signal intervals of the monitor laser signals is 4.12 ms, and the greatest common divisor of the measured signal intervals of monitor laser signals can be 0.01 ms. Thus, the timing setting time $t_s$ can be set to 4.12 ms, and the interval between the jamming laser signals can be set to 0.01 ms.

Also, the average of the measured signal intervals of the monitor laser signals is 6 ms, and thus, the transmitting time $t_{Tx}$ of the jamming laser signals can be set to three times 6 ms, i.e. 18 ms.

Thus, in the case illustrated in FIG. 5, the control unit 13 can measure the intervals between the five monitor laser signals received in the detection and measurement section to be 6.17 ms, 8.06 ms, 4.12 ms, and 7.27 ms, from which the timing setting time $t_s$, the interval $t_{interval}$ between jamming laser signals, and the transmitting time $t_{Tx}$ of the jamming laser signals can be determined.

As shown above, a laser transmitter 10 according to an embodiment of the invention can generate the jamming laser signals adaptively by measuring the signal intervals of the received monitor laser signals to generate information for the to-be-transmitted jamming laser signals, thereby jamming the monitor laser signals with great effectiveness.

Thus, a laser transmitter 10 according to an embodiment of the invention can generate jamming laser signals that can jam not only monitor laser signals having constant signal intervals but also monitor laser signals having random signal intervals.

The components of the embodiments described above can also be easily understood from the perspective of processes. That is, the components can each be understood as a process. Likewise, the processes of the embodiments described above can also be easily understood from the perspective of an apparatus' components.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., configured specially for storing and executing program instructions. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A laser transmitter comprising:
 a laser signal receiving unit configured to receive monitor laser signals transmitted by a laser-based speed monitor;
 a laser signal transmitting unit configured to transmit jamming laser signals against the received monitor laser signals; and
 a control unit configured to measure signal intervals of received monitor laser signals when the monitor laser signals are detected, compute information for the jamming laser signals by using the measured signal intervals, and generate the jamming laser signals according to the computed information,
 wherein the control unit:
 measures signal intervals sequentially by receiving a preset n number of monitor laser signals (where n is a natural number), and
 computes a timing setting time, a signal interval, and a transmitting time of the jamming laser signals by using the measured signal intervals.

2. The laser transmitter of claim 1, wherein the timing setting time is determined as a shortest signal interval from among the measured signal intervals.

3. The laser transmitter of claim 1, wherein the signal interval of the jamming laser signals is determined as a common divisor of the measured signal intervals.

4. The laser transmitter of claim 1, wherein the transmitting time of the jamming laser signals is computed by multiplying an average of the measured signal intervals by a preset number of monitor laser signals.

5. The laser transmitter of claim 1, wherein the control unit, after measuring the signal intervals sequentially by receiving the n number of monitor laser signals, transmits jamming laser signals for a duration of the computed transmitting time in the computed interval after a period of the timing setting time from a time point when an n-th monitor laser signal is received.

6. The laser transmitter of claim 5, wherein, if a monitor laser signal is received after a transmission of the jamming laser signals is completed, the control unit repeatedly transmits the jamming laser signals by setting a timing with the timing setting time from a time point when the received monitor laser signal is received.

7. A method for operating a laser transmitter, the method comprising:
- (a) receiving monitor laser signals transmitted by a laser-based speed monitor;
- (b) measuring a signal interval of the received monitor laser signals;
- (c) computing information for to-be-transmitted jamming laser signals by using the measured signal intervals; and
- (d) generating the jamming laser signals according to the computed information and transmitting the jamming laser signals, wherein the step (b) measures signal intervals sequentially by receiving a preset n number of monitor laser signals (where n is a natural number); and the step (c) computes a timing setting time, a signal interval, and a transmitting time of the jamming laser signals by using the measured signal intervals.

\* \* \* \* \*